G. A. TAYLOR.
TOOL HOLDER.
APPLICATION FILED FEB. 1, 1913.
1,083,230.
Patented Dec. 30, 1913.
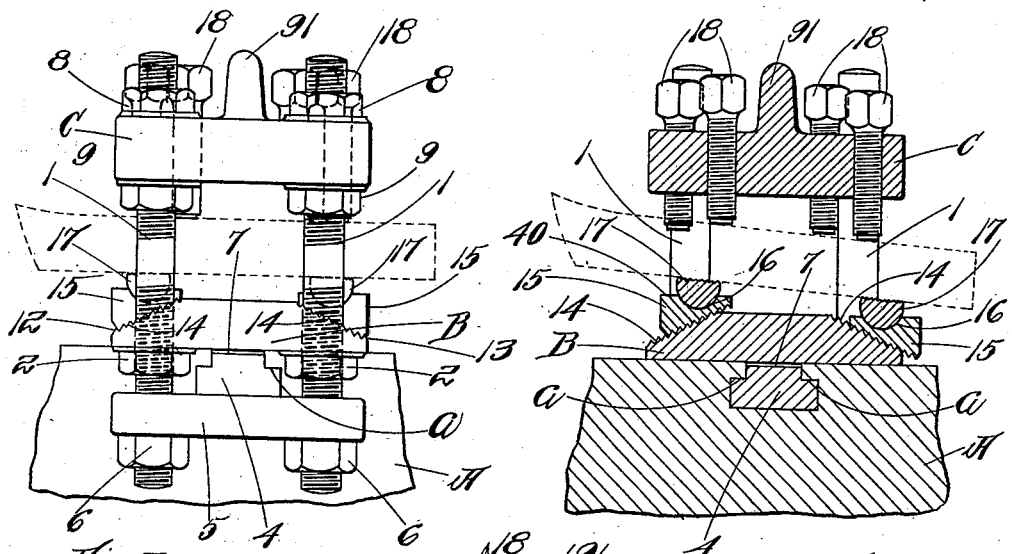
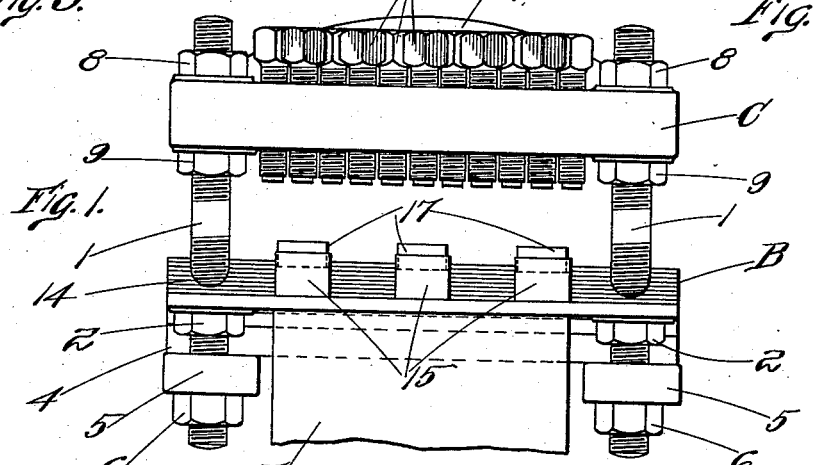
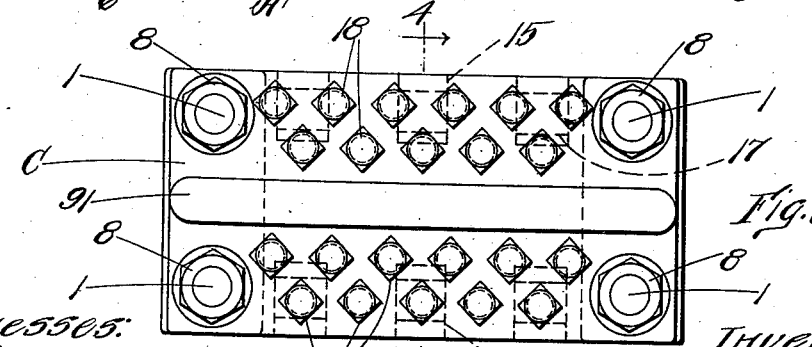

UNITED STATES PATENT OFFICE.

GEORGE A. TAYLOR, OF LYNN, MASSACHUSETTS.

TOOL-HOLDER.

1,083,230.

Specification of Letters Patent.   Patented Dec. 30, 1913.

Application filed February 1, 1913. Serial No. 745,643.

*To all whom it may concern:*

Be it known that I, GEORGE A. TAYLOR, a citizen of the United States, residing at Lynn, county of Essex, State of Massachusetts, have invented a certain new and useful Improvement in Tool-Holders, of which the following is a specification, reference being had therein to the accompanying drawings.

My invention relates to an improved tool holder designed especially to be used in connection with machines such as lathes or the like having two or more cutting tools which require to be adjusted independently of each other. Heretofore much time has been spent in adjusting the cutting tools to the proper angle for each separate kind of work. To accomplish this, where multiple tool holders have been required, it has been customary to employ shims or wedges by means of which the different tools have been adjusted to the desired angle. Such arrangements have not been satisfactory for the reason that they have sometimes failed to retain the tool in the desired position and also because the adjustment has been slow and difficult.

The object of my invention is to produce a tool holder which will retain the cutting tools firmly at any given angle or position and at the same time will permit them to be readily and independently adjusted to any other desired position.

The tool holder embodying my invention is so constructed that there is a direct pressure on the base thereof and a firm and secure device is provided.

It consists in certain novel features of construction, all as hereinafter more fully set forth in the following description of a tool holder embodying my invention and illustrated in the accompanying drawings forming a part hereof.

The novel features of my invention are pointed out and clearly defined in the claims at the close of the specification.

In the drawings,—Figure 1 is a side elevation of a multiple tool holder embodying my invention. Fig. 2 is a plan view of the same. Fig. 3 is an end view showing a tool secured therein in horizontal position. Fig. 4 is a section on line 4—4 of Fig. 2 looking in the direction of the arrows and showing a cutting tool therein at an angle to the horizontal.

Having reference to the drawings,—a portion of the cross slide of the carriage of a lathe is shown at A. On the cross slide A, is placed the base B of the tool holder to which it is secured, as will be described. The base B has at each of its corners a bolt 1 which is screw threaded into holes in the corners of the base. Check nuts 2 assist in relieving the strain on the screw threads in the base. At 4 is shown a T-strap or bar secured in the T-groove of the cross slide A of the lathe carriage. The ends of the T-strap 4 project beyond the sides of the cross slide. Between the lower ends of the bolts 1, I place a cross bar 5. This cross bar is moved up against the under side of the ends of the T-strap by nuts 6 on the bolts 1. It will be seen that there is a slight clearance, as indicated at 7, between the lower face of the base B and the upper surface of the T-strap 4, so that when the nuts 6 are taken up the bar 5 is brought firmly in contact with the under surface of the T-strap 4 and the lower surface of the base B is held firmly in contact with the upper surface of the cross slide of the lathe carriage. Furthermore, the shoulders *a* on the T-strap are brought in contact with the corresponding shoulders on the guide-way or T-groove in the cross slide of the lathe carriage. It will be seen from the foregoing that the tool holder is thereby firmly held in place on the cross slide.

A top plate C is secured to the upper ends of the corner bolts 1 by means of nuts above and below, numbered 8 and 9. The top plate is provided with some suitable means for bringing pressure to bear on the tool which is to be held in the holder, regardless of location. In practice, I have used a series of set screws 18, preferably placed in four rows in staggered relation to each other, but I do not limit myself to this particular manner of clamping the tool in place. When the set screws 18 are brought down forcibly on the top of the tool, the set nuts 2—2 on the corner bolts may be taken up to relieve the threads in the base B of the strain. Thereafter the tool holder may be moved around on the lathe cariage as required by loosening up the nuts 6—6. This may be done without disturbing the position of the tools in the tool holder.

The top plate C may be provided with a rib or web 91 running lengthwise thereof through the center of its upper surface to strengthen it. The arrangement of set screws described previously is a convenient one because it is such that no matter what is the position of the tools in the holder at least two set screws can be brought to bear upon it, one set screw being in one pair of staggered rows and the other in the other pair.

The side portions of the upper surface of the base B are comprised of two inclined faces 12 and 13 which run lengthwise of the base, as is clearly shown in Figs. 1, 3 and 4. These inclined faces are provided with ribs and grooves 14 running the entire length of the base. In cross section the ribs and grooves 14 are preferably of saw tooth form and inclined upwardly. On these inclined faces 12 and 13 are placed members 15 which I term pillow blocks and which have correspondingly grooved and ribbed inclined under surfaces. For convenience, the inclined faces of the pillow blocks 15 have about the same number of ribs as the inclined faces 12 and 13 of the base B. The pillow blocks may be adjusted vertically by being moved up or down on the inclined ribbed surfaces 12 and 13 and may be adjusted longitudinally of the base by sliding them along on the ribbed surfaces of the base. The grooves and ribs in the opposing faces of the base and pillow blocks interlock so that the pillow blocks are firmly supported.

Centrally of the upper surface 40 of the pillow block, I provide a round, transverse groove or bearing 16 in which is placed a swinging member or segment 17 having a substantially half round under surface and a flat top surface upon which the tool may rest. In order to prevent any possibility of slippage, I roughen the top surface of the swinging member or segment 17. It will be understood that a swinging member or segment 17 is provided for each pillow block 15.

As previously stated, the pillow blocks are adjusted lengthwise of the base by sliding them along the grooves in the inclined surfaces in the base and they are adjusted vertically by placing them higher up or lower down on the grooved surfaces. In setting the tools, the pillow blocks are properly positioned and the swinging members or segments 17 are put in place. The tool is then laid on the top of the swinging segments and the set screws are turned down. It will be seen that the pressure of the set screws on the tools will cause the swinging members or segments to adjust themselves to the angle of the under surface of the tool so that the upper surface of each segment is in contact throughout with the under surface of the tool. It will be seen, therefore, that the tool is firmly supported and may be adjusted to any angle desired. It will also be understood that the tool may be placed diagonally as well as at an angle to the horizontal by placing one pillow block a little farther along the groove than the corresponding pillow block on the other side of the base. The pairs of pillow blocks, one on each side of the base, form two points of support for the ends of each tool, and as many tools may be employed as there is space between the corner bolts 1, it being necessary simply to provide an additional pair of pillow blocks and swinging members for each additional tool which is to be used.

The tools may be adjusted in place quickly and accurately, and after the set screws have been tightened, the position of the tool holder may be changed bodily, as required, without disturbing the position of the tools in the tool holder.

What I claim is:

1. The improved tool holder comprising a base having inclined ribbed surfaces on opposite sides thereof, a pair of pillow blocks each having an inclined ribbed surface coöperating with an inclined ribbed surface of the base, and means for clamping a tool upon said pair of pillow blocks.

2. The improved tool holder comprising a base having two inclined ribbed surfaces on opposite sides thereof, a pair of pillow blocks each having an inclined ribbed surface coöperating with an inclined ribbed surface of the base, a swinging member supported by each of said pillow blocks, and means for clamping a tool on said pair of swinging members, whereby the said swinging members adjust themselves to the angle of inclination of the tool determined by the position of the pillow blocks on the said inclined ribbed surfaces of the base.

3. The improved tool holder comprising a base with two inclined ribbed surfaces on opposite sides thereof, a pair of pillow blocks each having an inclined ribbed surface coöperating with a ribbed surface on the base, a swinging member supported on each of said pillow blocks, a top plate, and a clamping screw in the top plate to clamp a tool onto said pair of said swinging members.

4. The improved tool holder comprising a base having two inclined ribbed surfaces on opposite sides thereof, a pair of pillow blocks each having an inclined ribbed surface thereon, and a pair of swinging members, one of a pair of coöperating members having a half-round bearing formed therein and the other member of said pair having a curved surface coöperating with said bearing, and means for clamping the tool onto the two uppermost members.

5. The improved tool-holder comprising a base with two inclined ribbed surfaces on two opposite longitudinal sides thereof, a pair of pillow blocks each having an inclined ribbed surface to coöperate with a ribbed surface on the base, said pillow blocks being much shorter than the base and slidable longitudinally on the ribbed surfaces thereof, and means for clamping a tool on said pair of pillow blocks.

6. The improved tool holder comprising a T-bar for insertion in the T-slot of a carriage, a base resting on the carriage, a top, cross-bars beneath projecting ends of said T-bar and bolts passing through the base and top and clamping the base onto the carriage and to the said T-bar.

7. The improved tool holder comprising a T-bar slidable in the T-slot of a carriage, a base resting on the carriage, a top, cross bars beneath projecting ends of said T-bar, bolts passing through the base and top and clamping the base onto the carriage and to the said T-bar, said top being adjustable vertically on said bolts, and clamping set screws passing through the top to clamp a tool between the top and base.

In testimony whereof I affix my signature, in presence of two witnesses.

GEORGE A. TAYLOR.

Witnesses:
WILLIAM A. MACLEOD,
ALICE H. MORRISON.

---

Copies of this patent may be obtained for five cents each, by addressing the "Commissioner of Patents, Washington, D. C."